US012454846B2

(12) United States Patent
Taylor et al.

(10) Patent No.: US 12,454,846 B2
(45) Date of Patent: Oct. 28, 2025

(54) LOCK HARDWARE BOX

(71) Applicant: Meshtec International Co., Ltd, Chiang Mai (TH)

(72) Inventors: Peter Syme Taylor, New Farm (AU); David Neil Edlin, Chiang Mai (TH); Michael G. Altneu, Scottsdale, AZ (US)

(73) Assignee: MESHTEC INTERNATIONAL CO., LTD, Chiang Mai (TH)

( * ) Notice: Subject to any disclaimer, the term of this patent is extended or adjusted under 35 U.S.C. 154(b) by 119 days.

(21) Appl. No.: 18/225,821

(22) Filed: Jul. 25, 2023

(65) Prior Publication Data

US 2024/0026707 A1 Jan. 25, 2024

Related U.S. Application Data

(60) Provisional application No. 63/391,935, filed on Jul. 25, 2022.

(51) Int. Cl.
*E05B 9/08* (2006.01)
*E05B 9/00* (2006.01)
*E05B 63/08* (2006.01)
*E06B 5/00* (2006.01)

(52) U.S. Cl.
CPC ................ *E05B 9/08* (2013.01); *E05B 9/002* (2013.01); *E05B 63/08* (2013.01); *E05B 2009/004* (2013.01); *E06B 5/003* (2013.01)

(58) Field of Classification Search
CPC . E05B 9/002; E05B 9/08; E05B 9/082; E05B 2009/004; E05B 63/08; E06B 5/11; E06B 5/113
See application file for complete search history.

(56) References Cited

U.S. PATENT DOCUMENTS

| | | | | | |
|---|---|---|---|---|---|
| 396,915 | A * | 1/1889 | Burgess | E05B 55/005 | 70/448 |
| 425,237 | A * | 4/1890 | Morton | E05B 9/002 | 16/211 |
| 3,513,674 | A * | 5/1970 | Rutherford | E05B 9/00 | 70/451 |
| 4,696,174 | A * | 9/1987 | Marks | E05B 9/08 | 70/462 |
| 4,887,856 | A * | 12/1989 | Percoco | E05B 15/0205 | 292/264 |
| 5,722,276 | A * | 3/1998 | Aigner | E05B 9/02 | 70/451 |

(Continued)

*Primary Examiner* — Christopher J Boswell
(74) *Attorney, Agent, or Firm* — Fitch, Even, Tabin & Flannery LLP

(57) ABSTRACT

A security lock hardware box is provided for installation in a door sash. The lock hardware box is installed in a door sash for receiving locking hardware. It has a body part having first chamber for receiving a door latching mechanism, and a second chamber for receiving a door locking mechanism. Front and rear cover plates securable over the front and rear face of the body part with respective openings and holes to receive the locking and latching mechanisms. The body part has protrusions for fitting within the door sash, the length of which can be greater to provide greater strength and security regardless of the size of the lock hardware box or the size of the door sash that can accommodate the lockbox.

16 Claims, 9 Drawing Sheets

(56) References Cited

U.S. PATENT DOCUMENTS

| | | | | |
|---|---|---|---|---|
| 6,581,333 | B2 * | 6/2003 | Kimball | E05B 63/0052 49/504 |
| 6,688,063 | B1 * | 2/2004 | Lee | E05B 9/08 70/141 |
| 7,690,230 | B2 * | 4/2010 | Gray | E05B 9/002 70/91 |
| 8,006,527 | B2 * | 8/2011 | Nowakowski | E05B 65/0007 292/346 |
| 11,377,874 | B2 * | 7/2022 | Cheng | E05B 17/2003 |
| 2007/0240465 | A1 * | 10/2007 | Clifford | E05B 63/0017 70/370 |
| 2019/0226240 | A1 * | 7/2019 | Sullivan | E05B 63/12 |

* cited by examiner

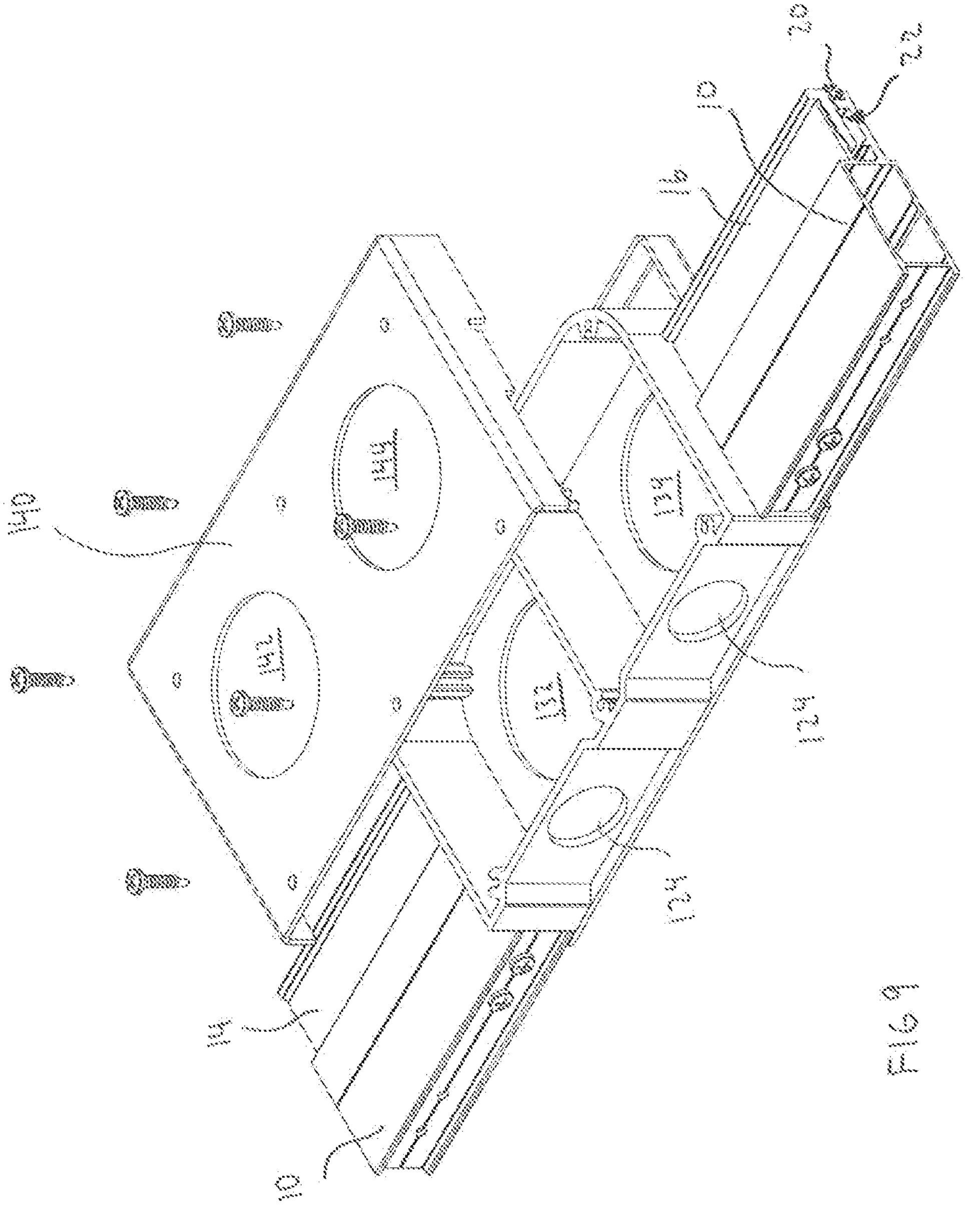
FIG 9
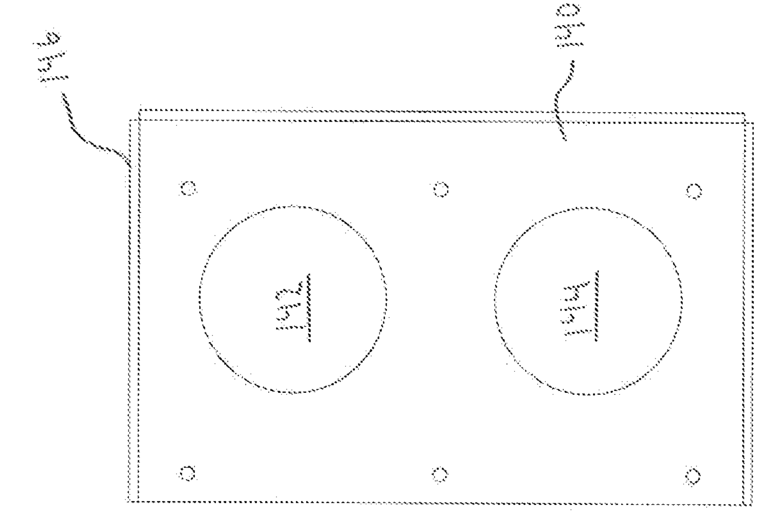

LOCK HARDWARE BOX

CROSS-REFERENCE TO RELATED APPLICATION

This application claims the benefit of U.S. Provisional Application No. 63/391,935, filed Jul. 25, 2022, which is incorporated by reference herein in its entirety.

FIELD

The present invention relates generally to locks, specifically, security lock hardware boxes for doors.

BACKGROUND

Conventional doors have latches and locks located in the door itself along an edge thereof. Typically, this includes a keyhole above. Turning the lock in the keyhole in turn moves a deadbolt within the door to engage or disengage a recess in a doorframe. Turning the doorknob or handle similarly activates a latch bolt.

With screen doors, the latches and locks are mounted within the frame or sash which defines a perimeter of the door. The limited size of the sash has heretofore limited the size and therefore the robustness of the latches and locks, which may be mounted within the sash.

It is an object of the present design to provide a locking and latching engagement for screen doors which is not limited in size by the size of the door sash.

SUMMARY

According to an aspect of the present invention there is provided a lock hardware box for installation in a door sash for receiving locking hardware. The hardware box comprises a body part defined by a frame extending about a perimeter thereof. The body part has a top end opposite a bottom end, which are interconnected by opposite first and second sides. The body part has a front face opposite a rear face and defines a first chamber for receiving a door latching mechanism and a second chamber for receiving a door locking mechanism therein.

A front cover plate is securable over the front face of the body part. The front cover plate has a first opening and a second opening registering respectively with the first and second chambers, for allowing a door handle to engage to said door latching mechanism and a door lock actuator to engage said door locking mechanism. A back cover plate is securable over the rear face of the body part and has a first hole and a second hole registering respectively with the first and second chambers, for allowing a door handle to engage said door latching mechanism and a door lock actuator to engage said door locking mechanism. The body part has at least one protrusion extending from each of the top end and the bottom end for fitting within the door sash.

In another aspect of the present invention, a composite panel system is provided having a lock hardware box as described above, a door sash with a hollow interior for receiving protrusions of the lock hardware box and having a gap for receiving the lock hardware box, and an air-permeable panel such as mesh having a cutout corresponding to the profile of the lock hardware box on the second side, for fitting with the lockbox on the second side and the door sash.

BRIEF DESCRIPTION OF THE DRAWINGS

These and other features of the invention will become more apparent from the following description in which reference is made to the appended drawings wherein:

FIG. 9 shows the body part and front cover plate of FIG. 7 preparing to receive a rear cover plate;

DETAILED DESCRIPTION

Figure 14:
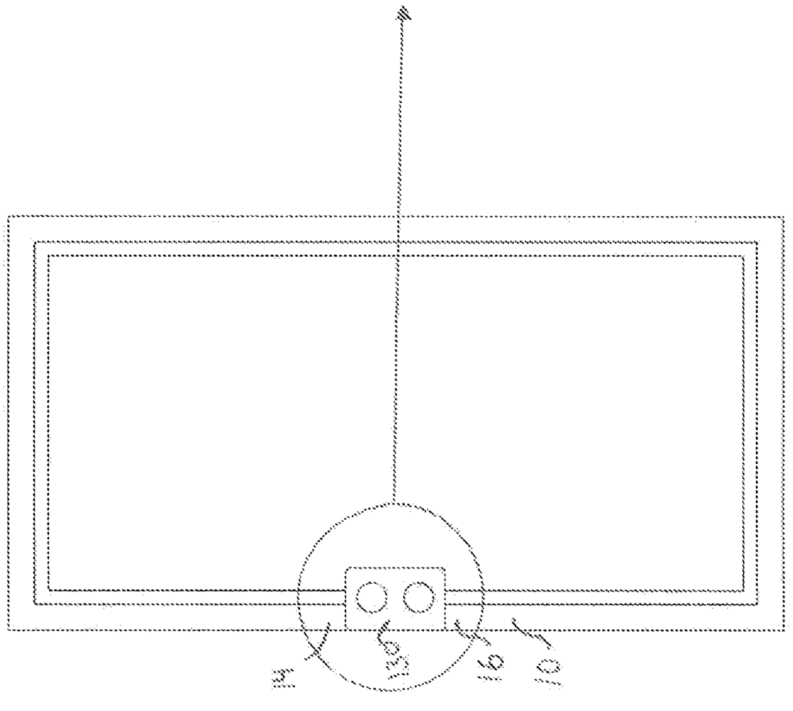
FIG. 14 shows a front elevation view of the hardware box installed in the sash of a door having an air permeable panel.

Reference is now made to FIGS. 1 through 13, in which one illustrative embodiment of a lock hardware box is indicated generally at reference 100. According to an aspect of the present invention there is provided a lock hardware box 100 for installation in a door sash 10 for receiving locking hardware. The hardware box 100 has a body part 102 defined by a frame 103 extending about a perimeter thereof. The body part 102 defines a top end 104 opposite a bottom end 106, which are interconnected by opposite first and second sides, 108, 110. The body part 102 has a front face 112 opposite a rear face 114 and defines a first chamber 116 for receiving a door latching mechanism and a second chamber 118 for receiving a door locking mechanism therein as can be seen, for example, in FIG. 14.

Figure 7:
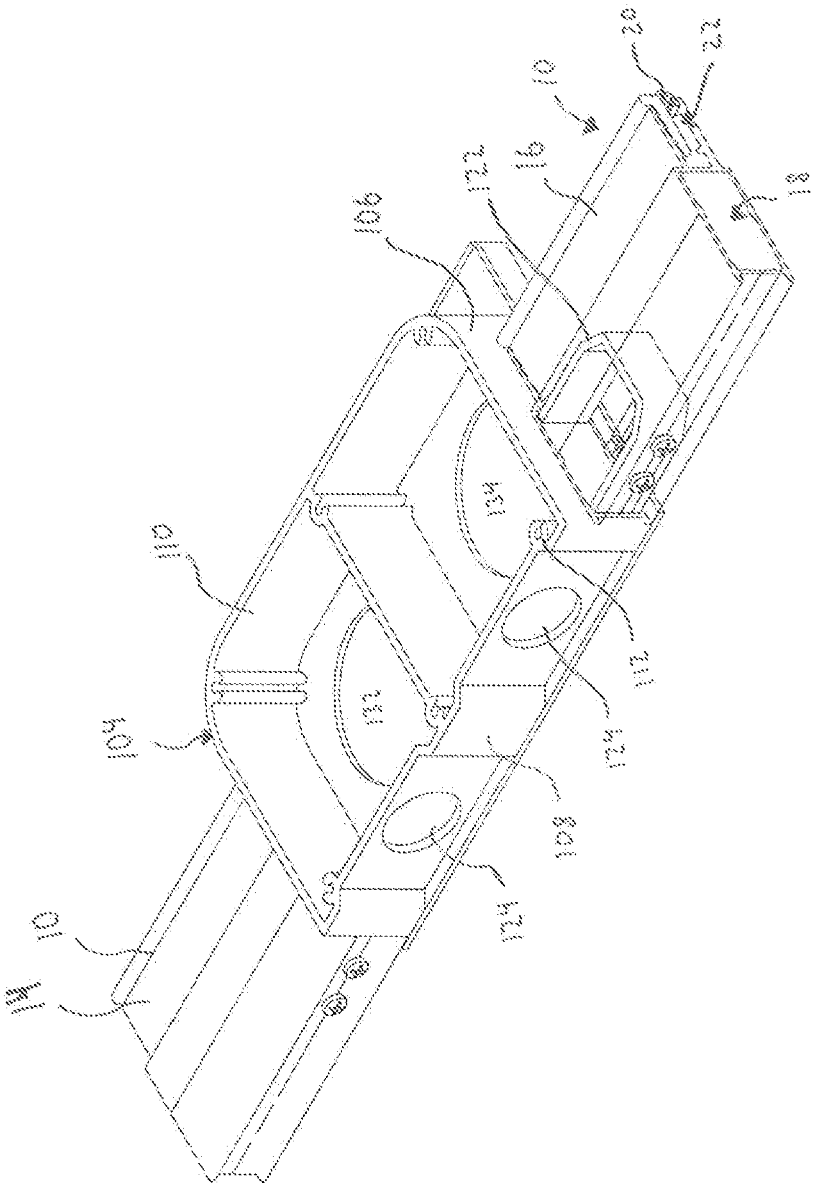
FIG. 7 is a top perspective view corresponding to FIG. 6A and showing protrusions of the body part being received in the door sash in accordance with an embodiment of the present invention.

Although the first chamber 116 and second chamber 118 are shown to be generally large relative to the marginal perimeter of the frame 113 of the body part 102, the body part 102 may be more substantial with the front face 112 and the rear face 114 having a greater surface area. For example, as shown in FIG. 7 with the welded box, the body part 102 may have more surface area on its front face for securing the front cover plate. Similarly, the body part may have more surface are on its rear face for securing the rear cover plate. The precise shape and surface area of the body part may be varied so long as the first and second chambers 116, 118 permit the door latching mechanism and door locking mechanism to be received therein.

As can be seen more clearly in FIGS. 1, 2A, 2B, 5, 6A, 6B, and 7, the body part 102 has at least one protrusion 120, 122 extending respectively from each of the top end 104 and the bottom end 104 for fitting within the door sash 10. The protrusions 120, 122 can be of any length for fitting within the door sash 10. The length of the protrusions can affect the strength and security of the hardware box. For example, longer protrusions that fit into the door sash offer greater strength. This greater strength, in turn, can offer greater security to the hardware box. The security of the hardware box, thus, depends less on the size of the hardware box and more on the size of the protrusions. Thus, narrower door sashes can still have more robust locks due to the installation of hardware boxes with protrusions of greater length.

Although shown as only one protrusion, more than one protrusion from each end can be possible. Although shown as generally rectangular shaped and hollow, the protrusion may be hollow or solid, semi-circular, or any other cross-section as will be known to one with skill in the art so long as it is received and fit within the door sash. The protrusions 120, 122 may be further secured to the door sash with fasteners such as screws as shown in FIG. 7.

The hardware box 100 further has spaced apart passages 124 in the first side 108 for allowing extension of the locking mechanism or latching mechanism therethrough, as can be seen in the figures throughout.

Figure 6B:
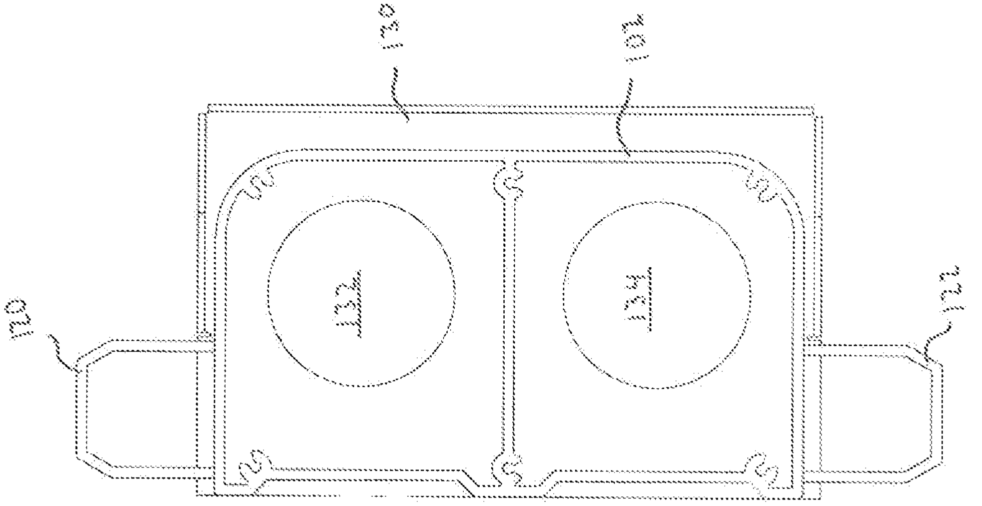
FIG. 6B is a top plan view of the front cover plate secured to the body part of FIG. 6A.
Figure 8A:
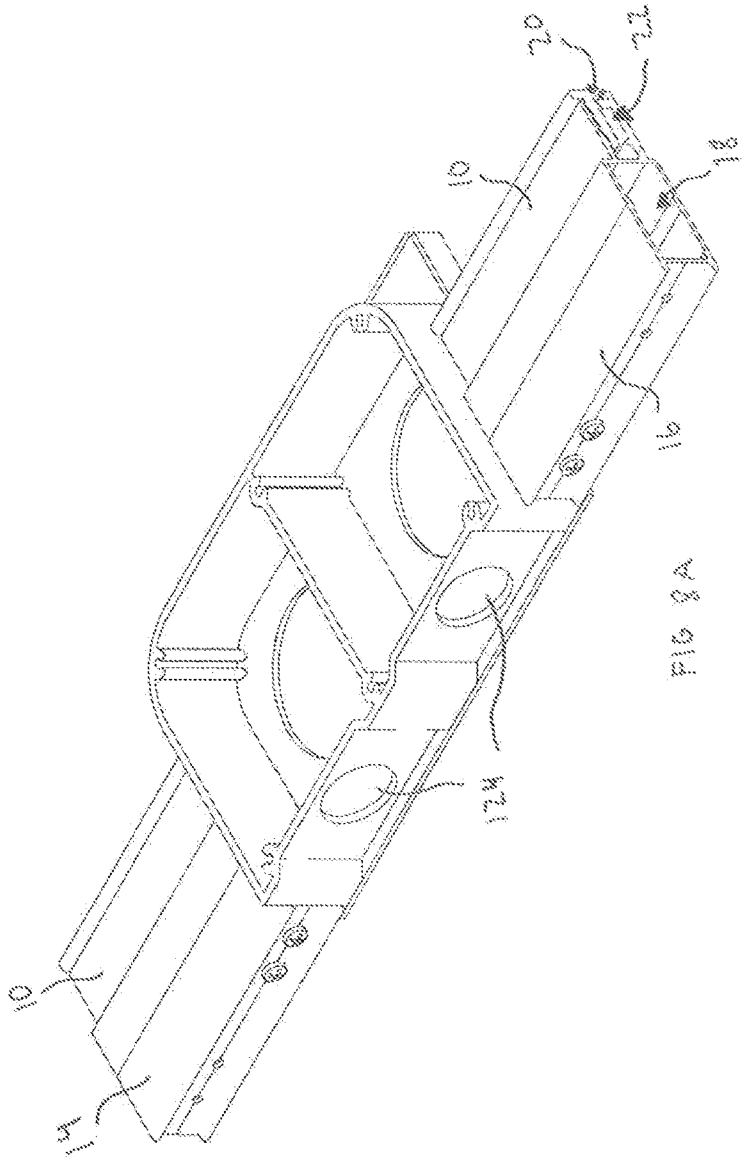
FIG. 8A shows the body part and front cover plate of FIG. 7 before receiving the air permeable panel of FIG. 5.
Figure 8B:
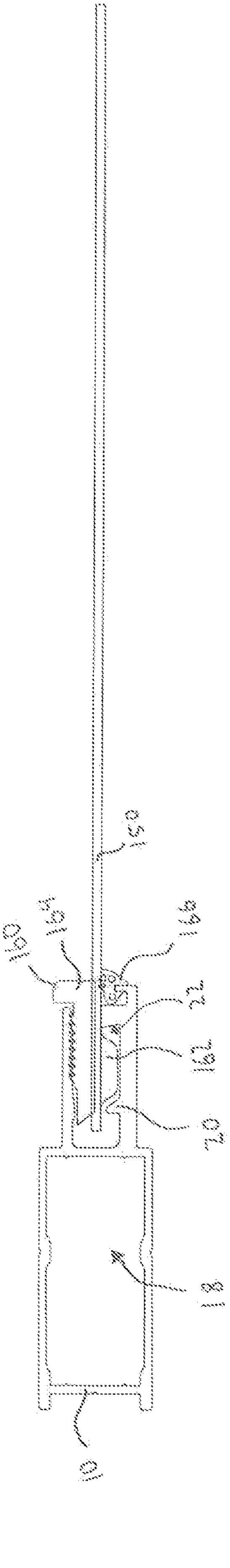
FIG. 8B shows a side elevation view corresponding to FIG. 7.
Figure 12:
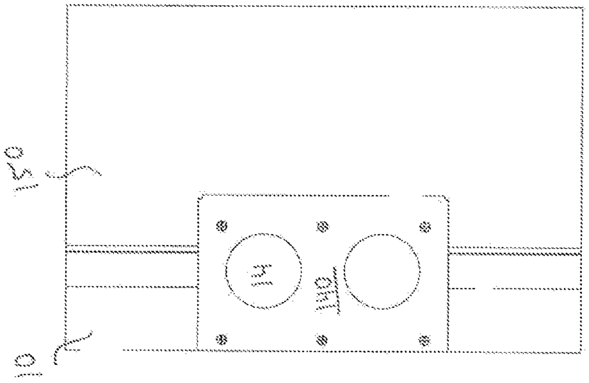
FIG. 12 shows a rear elevation view corresponding to FIG. 10.
Figure 11:
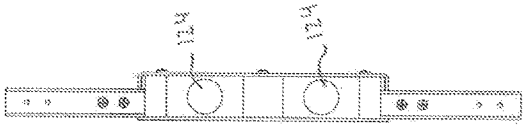
FIG. 11 shows a side elevation view corresponding to FIG. 10.
Figure 10:
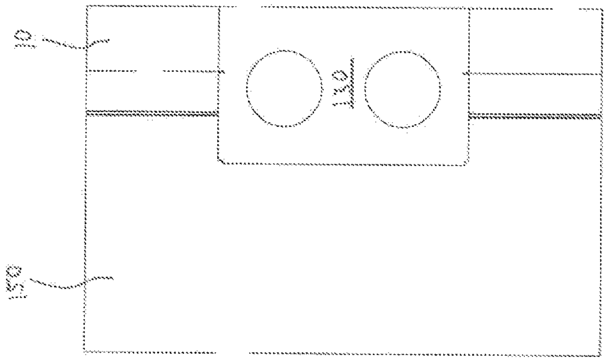
FIG. 10 shows a front elevation view of the hardware box in assembled configuration mounted to a sash and air permeable panel.
Figure 13:
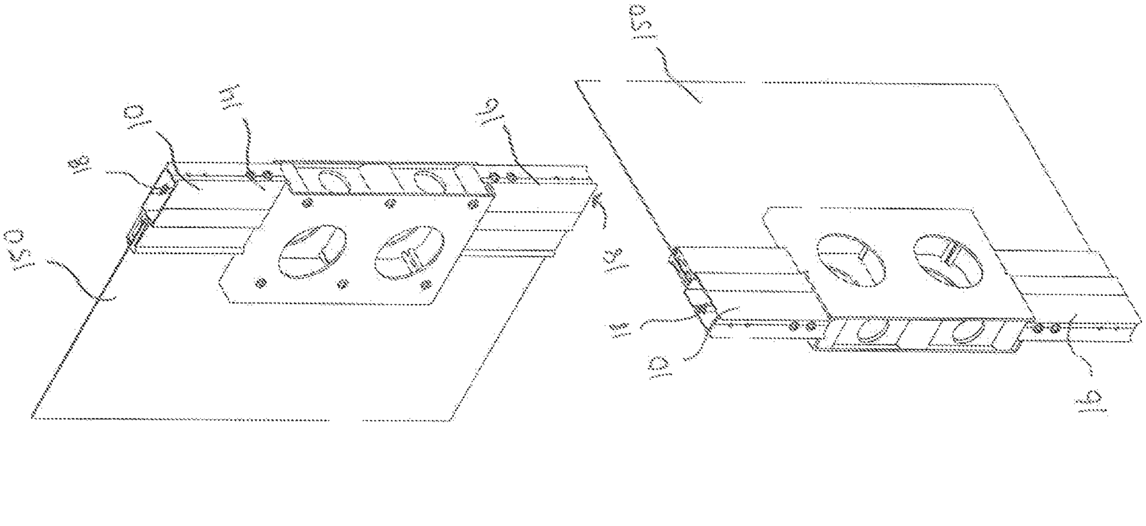
FIG. 13 shows a perspective view of the hardware box mounted to a sash and air permeable panel.
Figure 15:
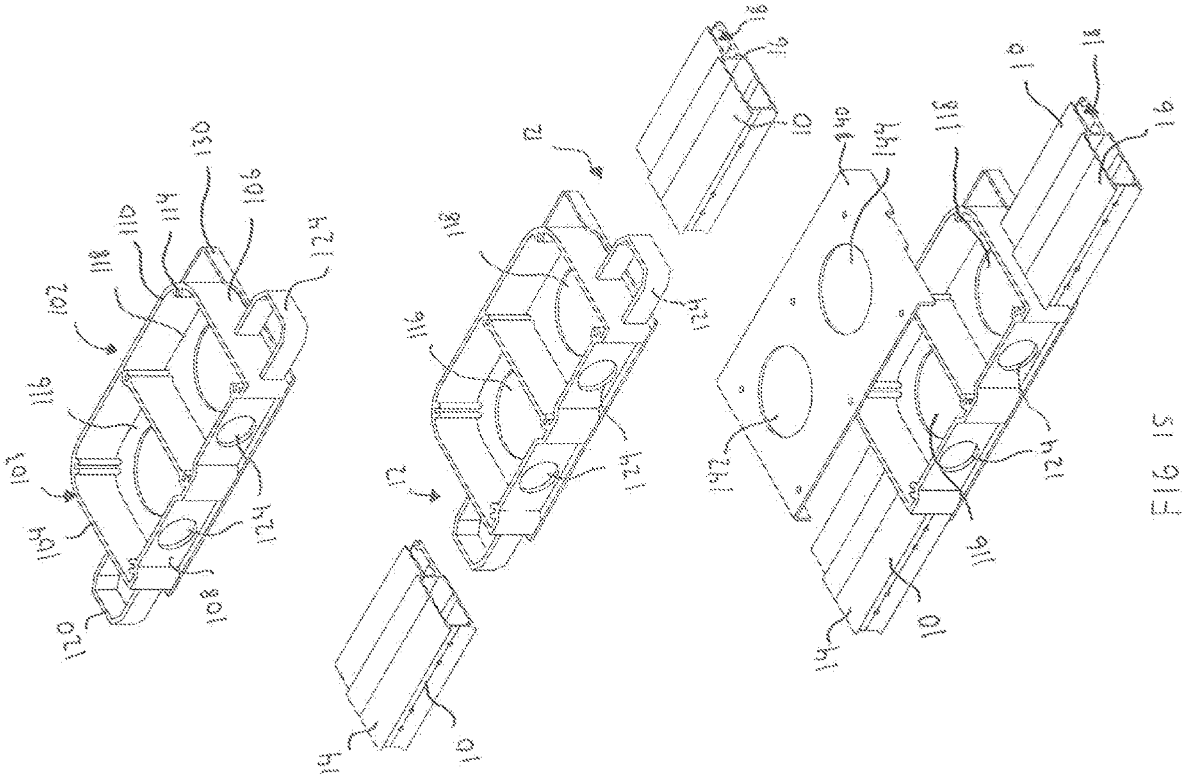
FIG. 15 shows an exploded perspective view of the hardware box corresponding to FIG. 1 being assembled.

The hardware box 100 further has a front cover plate 130 for securing over the front face 112 of the body part 102. The front cover plate 130 may be secured over the front face 112 of the body part 102 by welding as shown in FIGS. 6B and 7. It may be secured in any other way that limits tampering of the hardware box 100 from the door's exterior.

The front cover plate 130 has a first opening 132 and second opening 134 registering respectively with the first and second chambers, 116, 118, for allowing a door handle to engage said door latching mechanism and a door lock actuator to engage said door locking mechanism. The first and second openings 130, 132 are shown to be sized and shaped according to the hardware (e.g., door latching mechanism and door locking mechanism) being received therethrough. Although shown as circular, they could take another shape or size to accommodate the hardware that is being received.

Figure 1:
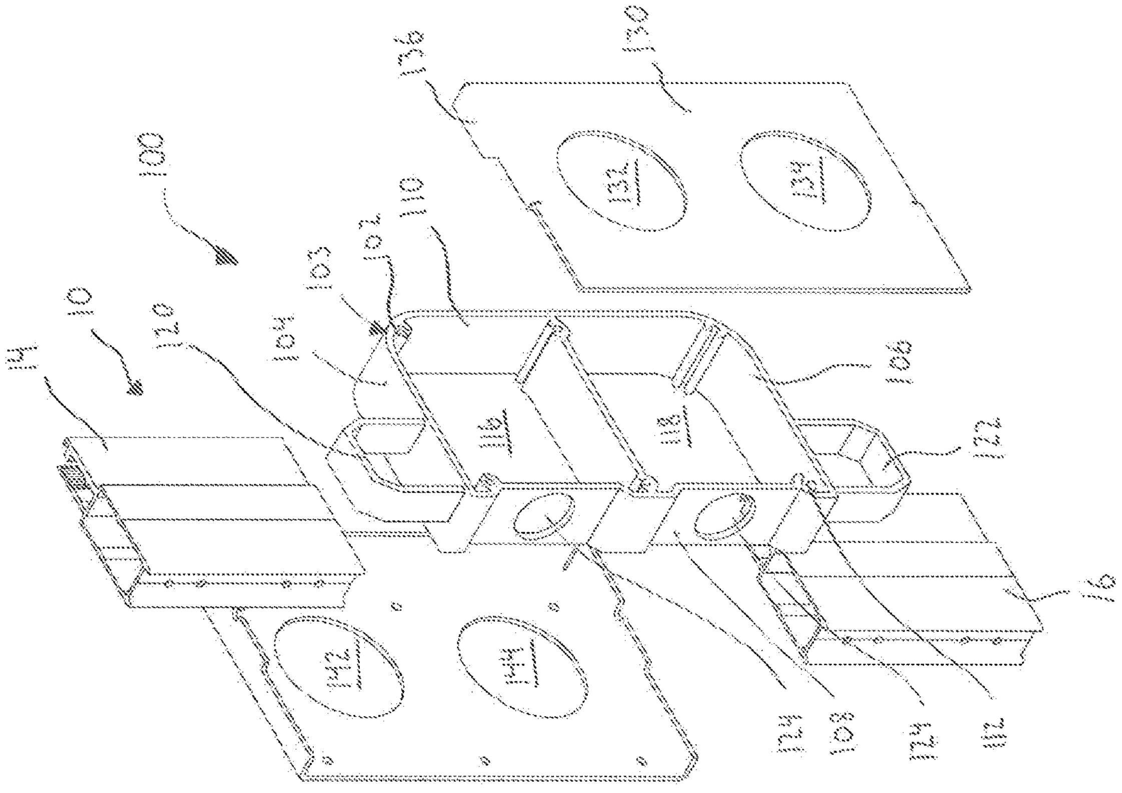
FIG. 1 is an exploded perspective view of a lock hardware box and an upper and lower door sash in accordance with one embodiment of the present invention.
Figure 3A:
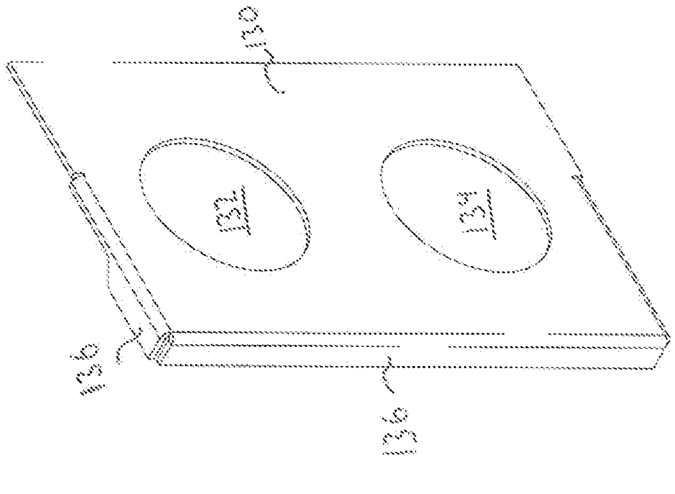
FIG. 3A is a perspective view of a front cover plate of the lock hardware box of FIG. 1.
Figure 6A:
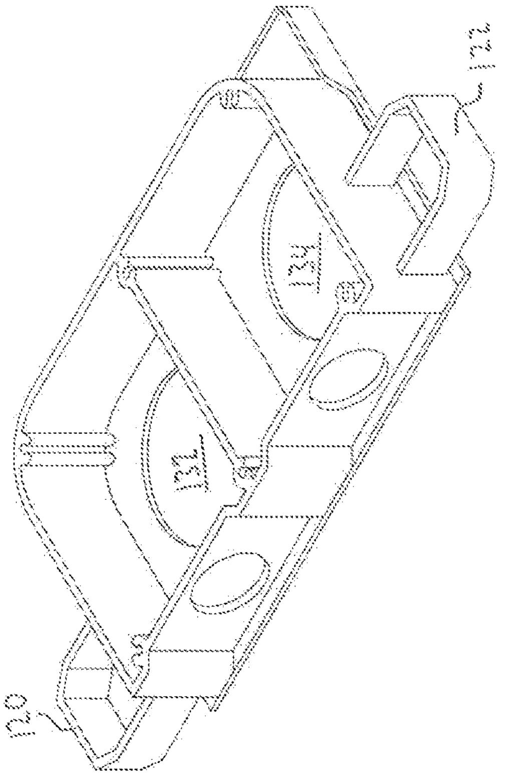
FIG. 6A is a perspective view of the front cover plate secured to the body part.
Figure 2B:
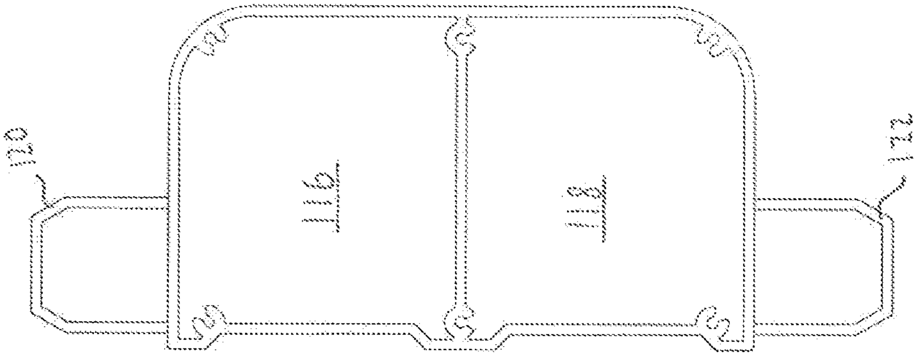
FIG. 2B is a top plan view of the body part of FIG. 2A.
Figure 3B:
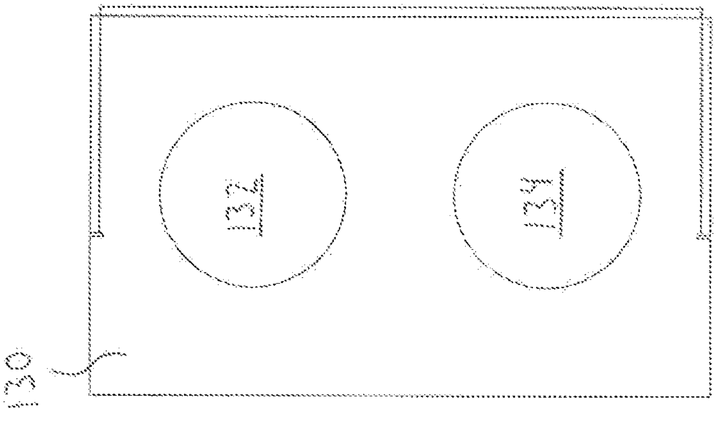
FIG. 3B is a top plan view of the front cover plate of FIG. 3A.
Figure 5:
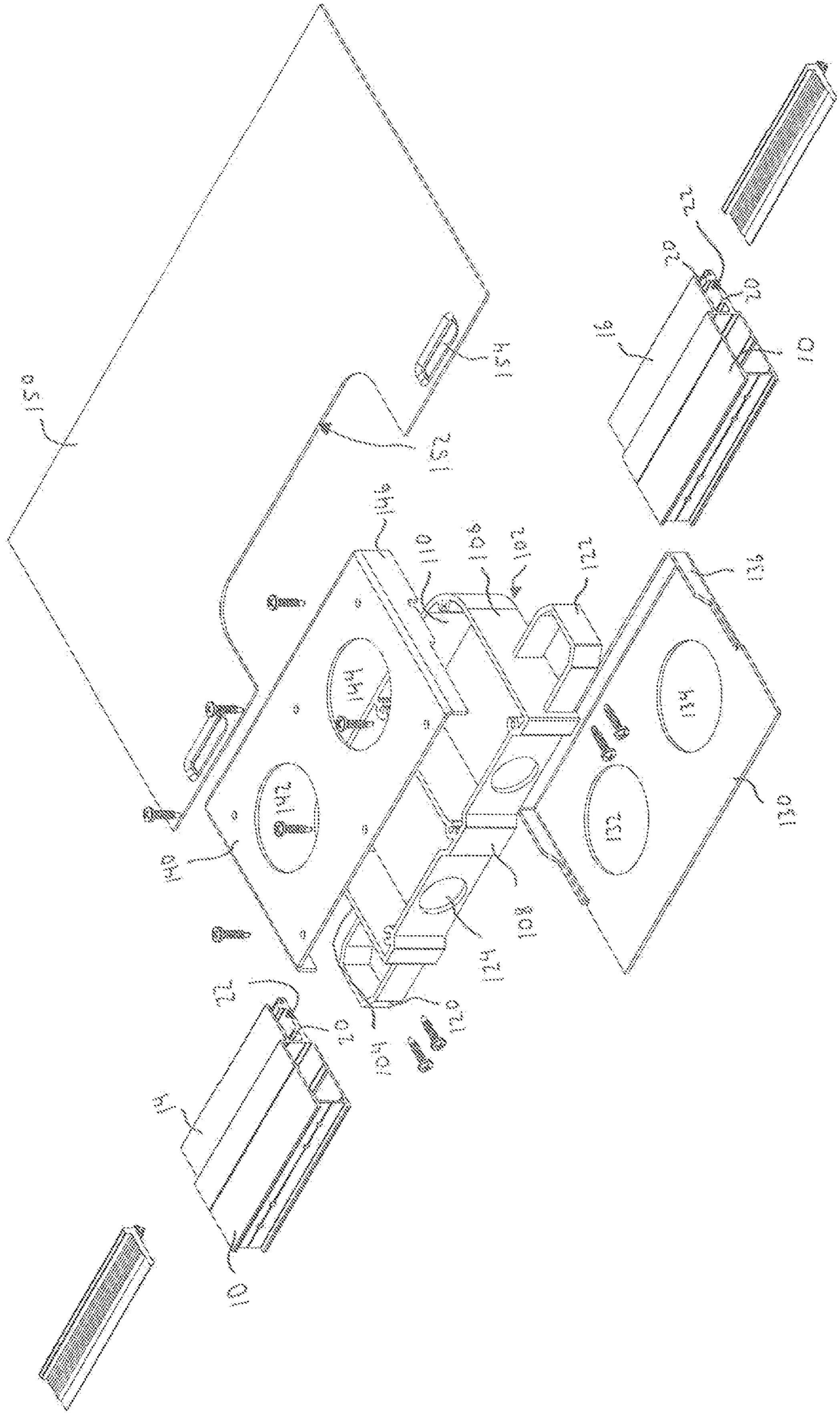
FIG. 5 is an exploded perspective view of the lock hardware box of FIG. 1 with an air permeable panel.

As can be seen more clearly in FIGS. 1, 3A, and 5, the front cover plate 130 is folded over to form at least one sidewall 136 for partially obscuring the body part 102 along the second side 110. It may have further sidewalls to partially obscure the top and bottom ends 104, 106. The sidewall 136 along the top and bottom end 104, 106 may be shaped to accommodate the protrusions 120, 122 of the body part 102.

Referring now to FIGS. 1, 4, 5, and 12, the lock hardware box 100 also has a rear cover plate 140 for securing over the rear face 114 of the body part 102 as shown. The rear cover plate 140 also has a first hole 142 and a second hole 144 registering respectively with the first and second chambers 116, 118, for allowing a door handle to engage said door latching mechanism and a door lock actuator to engage said door locking mechanism. Although the first and second holes 142, 144 are shown as circular, they could take another shape or size to accommodate the hardware that is being received.

Figure 4:
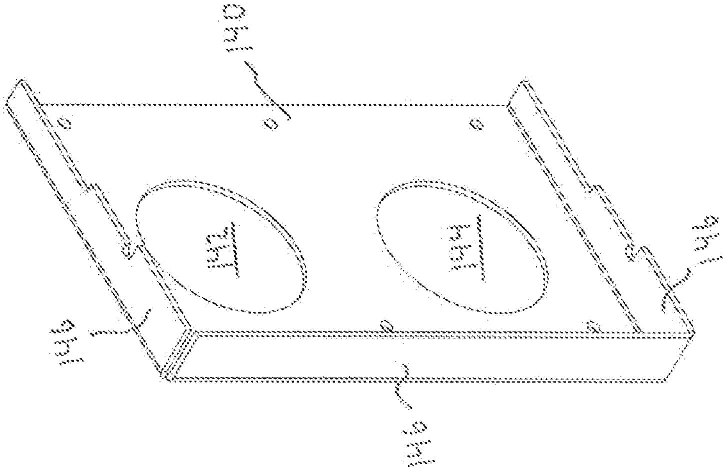
FIG. 4 is a perspective view of the back cover plate of the lock hardware box of FIG. 1.
Figure 2A:
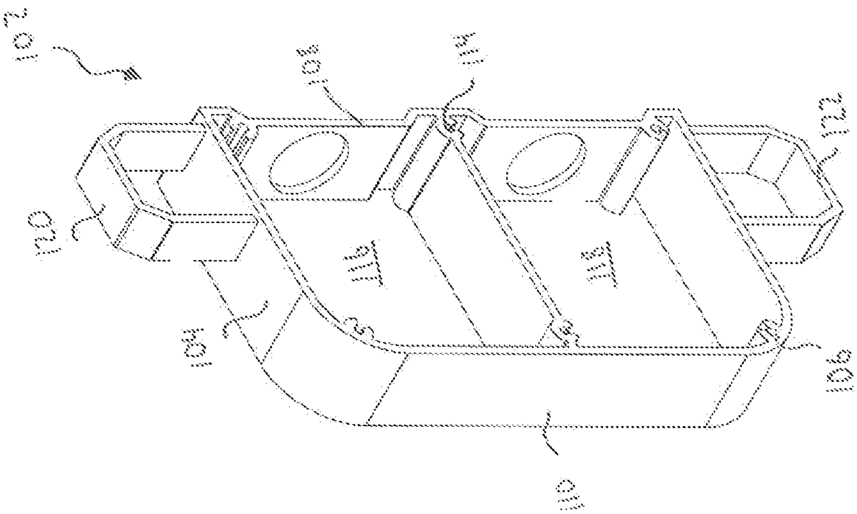
FIG. 2A is a perspective view of a body part of the lock hardware box of FIG. 1.

As can be seen more clearly in FIGS. 1, 4, and 5, the rear cover plate 140 is folded along the edge to create edgewall 146 to partially obscure the body part 102 along the second side. It may also be folded along the edges to partially obscure the top and bottom ends 104, 106. These edgewalls 146 may be shaped to accommodate the protrusions 120, 122 of the body part 102.

The rear cover plate 140 may be secured to the rear face of the body part 102 with fasteners. It may have pre-drilled holes for receiving such fasteners. Similarly, the body part 102 may be shaped to receive the same fasteners along its perimeter.

In another embodiment, a lock hardware box and door system may be provided. The lock hardware box 100 as described above may be provided for fitting with a door sash 10 having a gap 12 therein defining an upper sash 14 and a lower sash 16 for receiving the lock hardware box 100 in the gap 12. The upper sash 14 and the lower sash 16 have a hollow interior 18 for receiving the protrusions 120, 122 of the lock hardware box 100. The protrusions 120, 122 may be sized and shaped to correspond to the hollow interior 18 of the upper and lower sashes 14, 16. This can be seen more clearly in FIG. 7.

As shown in FIGS. 5, and 8-13, a panel 150 is also provided having a cutout profile 152 for fitting with the door sash 10 and the lock hardware box 100 on the second side 110. The panel 150 may be air permeable such as mesh. The panel 150 may have further slots 154 located adjacent the cutout profile 152 for engagement with the door sash 10. For example, the upper and lower sash 14, 16 may have a channel 22 positioned to receive the panel 150. Thus, the panel 150 may be inserted into the channel 22 of the upper and lower sash 14, 16. As shown more clearly in FIG. 8, the channel 22 may have spaced apart ridges 20 over which the slots 154 of the panel 150 are positioned when received. To obstruct access to the channel 22 and to secure the panel 150 to the channel 22 a stopper 160 may be inserted into the channel 20. The stopper 160 may have an extension 162, such as a wedge for insertion through the slots 154 to secure the panel 150 to the channel 20 of the sash 10. The stopper 160 may have a wall 164 that extends along an upper entry 24 of the channel 22 to obstruct access to the channel 22. The stopper 160 may have a further seal 166 that extends a lower entry 26 of the channel 22 to obstruct access to the channel 22. Other means of securing the panel 150 to the sash 10 and of obstructing access to the channel will be known to one with skill in the art.

One or more currently preferred embodiments have been described by way of example. It will be apparent to persons skilled in the art that a number of variations and modifications can be made without departing from the scope of the invention as defined in the claims.

PARTS LIST

10 door sash
12 gap
14 upper sash
16 lower sash
18 hollow interior
20 ridges
22 channel

24 upper opening
26 lower opening
162 extension
100 hardware box
102 body part
103 frame
104 top end
106 bottom end
108 first side
110 second side
112 front face
114 rear face
116 first chamber
118 second chamber
120 top protrusion
122 bottom protrusion
124 passages
130 front cover plate
132 first opening
134 second opening
136 sidewall
140 rear cover plate
142 first hole
144 second hole
146 edgewall
150 panel
152 cutout profile
154 slots
160 stopper
162 extension
164 wall
166 seal

What is claimed is:

1. A lock hardware box for installation in a door sash for receiving locking hardware, the hardware box comprising:
- a body part defined by a frame extending about a perimeter thereof;
- said body part defining a top end opposite a bottom end, and interconnected by opposite first and second sides;
- said body part having a front face opposite a rear face and defining a first chamber for receiving a door latching mechanism and a second chamber for receiving a door locking mechanism therein, a wall separating the first chamber from the second chamber;
- a front cover plate securable over said front face of said body part;
- said front cover plate having a first opening and a second opening registering respectively with said first and second chambers for allowing a door handle to engage said door latching mechanism and a door lock actuator to engage said door locking mechanism; and
- a back cover plate securable over said rear face of said body part;
- said back cover plate having a first hole and a second hole for registering respectively with said first and second chambers for allowing a door handle to engage said door latching mechanism and a door lock actuator to engage said door locking mechanism;
- wherein said body part has at least one protrusion extending from each of said top end and said bottom end for fitting within the door sash.

2. The lock hardware box of claim 1, further comprising two spaced apart passages in said first side for allowing extension of said door latching mechanism and said door locking mechanism through each of the two spaced apart passages.

3. The lock hardware box of claim 1, wherein the front cover plate is folded over on one end to form a side wall and a rear wall for partially encasing said body part along said second side.

4. The lock hardware box of claim 1, wherein said back cover plate is folded along edges to create edgewalls to partially obscure the top end, bottom end, and second side of the body part.

5. The lock hardware box of claim 1, wherein said front cover plate is securable over said front face of said body part by welding.

6. The lock hardware box of claim 1, wherein said back cover plate is securable over said rear face of the body part by fasteners.

7. A lock hardware box and door system, comprising:
- the lock hardware box of claim 1;
- a door sash having a gap therein defining an upper sash and a lower sash for receiving the lock hardware box in said gap;
- said upper sash and said lower sash having a hollow interior for receiving protrusions of said lock hardware box; and
- a panel having a cutout profile for fitting with said door sash and said lock hardware box on said second side.

8. The lock hardware box and door system of claim 7, wherein said protrusions are sized and shaped to correspond to said hollow interior of said upper and lower sashes.

9. The lock hardware box and door system of claim 7, wherein said panel is air permeable.

10. The lock hardware box and door system of claim 7, wherein said panel is mesh.

11. The lock hardware box and door system of claim 7, wherein said panel is received by a channel formed in the door sash.

12. The lock hardware box and door system of claim 11, wherein said channel has spaced apart ridges for registration with a plurality of slots on said panel located adjacent the cutout profile.

13. The lock hardware box and door system of claim 12, further comprising a stopper inserted into said channel for obstructing access to said channel, said stopper having an extension for insertion into said slots when positioned over said spaced apart ridges for securing said panel to said channel, and said stopper having a wall for extending along an upper entry of said channel to obstruct access to said channel.

14. The lock hardware box and door system of claim 13, wherein the stopper further comprises a seal for extending along a lower entry of said channel to obstruct access to said channel.

15. The lock hardware box and door system of claim 7, wherein:
- the upper sash comprises:
  - a first hollow interior portion for receiving a first protrusion extending from the top end of the body part;
  - a first channel receiving a first portion of the panel; and
  - a first wall separating the first hollow interior portion from the first channel;
- the lower sash comprises:
  - a second hollow interior portion for receiving a second protrusion extending from the bottom end of the body part;
  - a second channel receiving a second portion of the panel; and
  - a second wall separating the second hollow interior portion from the second channel.

16. The lock hardware box and door system of claim 15, wherein:

the first hollow interior portion is open facing in a first direction to receive the top end of the body part and the second hollow interior portion is open facing in a second direction to receive the bottom end of the body part; and the first channel and the second channel are each open facing in a third direction perpendicular to the first and second directions to receive the first portion and the second portion of the panel, respectively.

* * * * *